Jan. 14, 1958  A. R. GRAD  2,819,935
SEAL FOR VERY HIGH PRESSURES
Filed Sept. 7, 1954
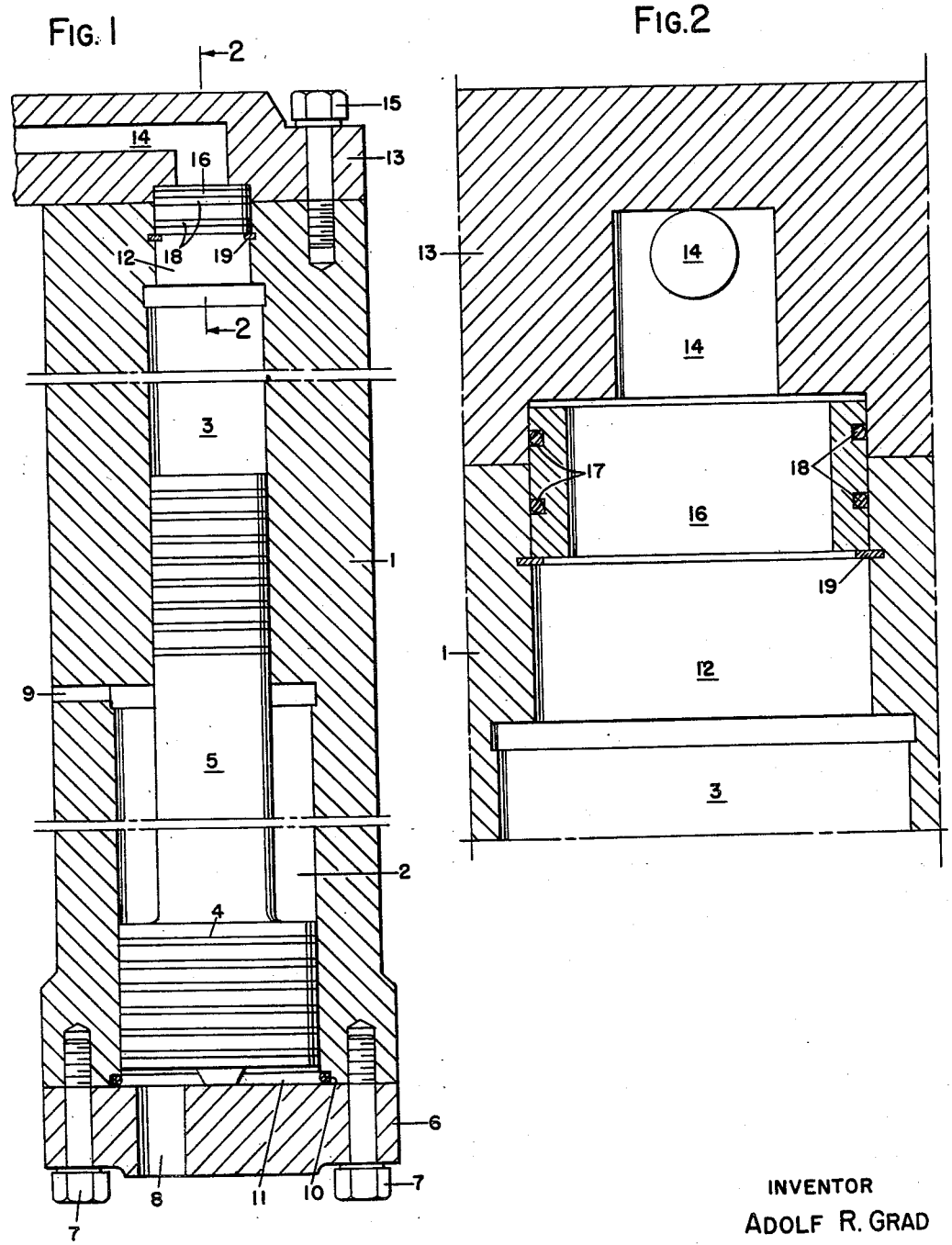
INVENTOR
ADOLF R. GRAD
BY
*Wesley P. Merrill*
ATTORNEY

United States Patent Office 2,819,935
Patented Jan. 14, 1958

2,819,935

SEAL FOR VERY HIGH PRESSURES

Adolf R. Grad, Milwaukee, Wis., assignor to The Oilgear Company, Milwaukee, Wis., a corporation of Wisconsin Application September 7, 1954, Serial No. 454,265

4 Claims. (Cl. 309—2)

This invention relates to sealing means for preventing leakage of fluid from fluid pressure devices such as hydraulic presses and intensifiers.

When certain fluid pressure devices are subjected to very high pressures, the parts thereof will yield and permit fluid to leak therefrom or to leak from one part into another part of the device.

The present invention has as its primary object to provide a seal which will prevent fluid from leaking out of a fluid pressure device or leaking from one part into another part of the device regardless of how high the pressure may become.

A seal embodying the invention has the advantage that it may be manufactured economically and readily installed in a fluid pressure device.

Other objects and advantages will appear from the following description of an embodiment of the invention illustrated in the accompanying drawing in which the views are as follows:

Fig. 1 is a vertical section through a hydraulic intensifier which is provided with a seal embodying the invention.

Fig. 2 is a section taken through the upper part of the intensifier on the line 2—2 of Fig. 1 and drawn to a much larger scale.

The intensifier shown in the drawing includes a body 1, which has a large power cylinder 2 and a smaller concentric pressure cylinder 3 formed therein, a piston 4 which is closely fitted in cylinder 2 to reciprocate therein and a ram 5 which is fixed to or formed integral with piston 4 and is closely fitted in cylinder 3 to reciprocate therein. Cylinder 2 is closed at its outer end by an end head 6 which is securely fastened to body 1 by a plurality of large closely spaced bolts 7 of which only two appear in the drawing.

Piston 4 is adapted to be moved upward by high pressure liquid supplied to the lower end of cylinder 2 through a port 8 formed in end head 6 and it is adapted to be moved downward by low pressure liquid supplied to the upper end of cylinder 2 through a port 9 formed in body 1. In order to prevent leakage of liquid through the joint between body 1 and head 6, an annular groove 10 is formed in the wall of cylinder 2 at the very end thereof and an O-ring packing 11 is arranged in groove 10 and is compressed between head 6 and the bottom of groove 10.

Pressure cylinder 3 communicates with a bore 12 which is formed partly in body 1 and partly in an end head 13 having a discharge passage 14 formed therein in communication with bore 12. End head 13 is securely fastened to body 1 by a plurality of closely spaced bolts 15 of which only one appears in the drawing.

In order to prevent leakage of liquid through the joint between end head 13 and body 1, a sleeve 16 is slidably fitted in bore 12, two annular grooves 17 are formed in the outer peripheral surface of sleeve 16 at opposite sides of the joint between body 1 and head 13, and an O-ring 18 of yieldable material is fitted in each groove 17. Movement of sleeve 16 toward cylinder 3 is limited by a snap ring 19 fitted in a suitable groove formed in the wall of the part of bore 12 in body 1. Each O-ring 18 has an inside diameter equal to the diameter of groove 17 and an outside diameter somewhat greater than the diameter of bore 12 so that the O-rings are compressed in groove 17 and have their outer peripheral surfaces in firm engagement with the wall of bore 12 and prevent escape of liquid through the joint between body 1 and end head 13.

The arrangement is such that, if discharge of liquid from the device is resisted, motive liquid supplied to port 8 will cause piston 4 to move ram 5 upward and ram 5 to expel liquid from cylinder 3 at a rate and at a pressure determined by the relative cross-sectional areas of piston 4 and ram 5 which have been indicated as having a ratio of 3:1. The intensifier shown is adapted to create pressures of at least 15,000 p. s. i. the creation of which requires that liquid be supplied to port 8 at a pressure of at least 5,000 p. s. i.

Such a high pressure in cylinder 3 causes elastic deformation of end head 13 and bolts 15 and a resultant slight separation of the joint between head 13 and body 1. If that joint were sealed by inserting an O-ring therein as is the usual practice in joints of that kind, the very high pressure in cylinder 3 and the resultant deformation of head 13 and bolts 15 would cause the O-ring to be extruded into the joint and thereby be destroyed.

In the present construction however, a high pressure in cylinder 3 expands sleeve 16 and urges its outer peripheral surface against the wall of bore 12 with a force proportional to the pressure so that there is no clearance between sleeve 16 and the wall of bore 12. Consequently, O-rings 18 cannot be extruded by the high pressure and there will be no leakage through the joint between end head 13 and body 1 regardless of how high a pressure may be created by the intensifier or how much elastic deformation of head 13 and bolts 15 is caused by the high pressure.

The invention disclosed herein may be modified in various ways and adapted to various devices without departing from the scope of the invention which is hereby claimed as follows:

1. In a fluid pressure device having two parts rigidly fastened to each other and a bore of substantial diameter formed in both of said parts and having walls thick enough to withstand a pressure of such magnitude that it could cause a slight separation of said parts, the combination with said parts of a sleeve slidably fitted in said bore and spanning the joint between said parts, continuous grooves formed in the outer peripheral surface of said sleeve at opposite sides of said joint, and a continuous packing of yieldable material arranged in each of said grooves and having a thickness greater than the depth of said grooves, said sleeve being of such a thickness that a predetermined high pressure therein will expand said sleeve and force its outer periphery against the wall of said bore.

2. In a fluid pressure device having two parts, bolts fastening said parts to each other and a cylindrical bore of substantial diameter formed in both of said parts and having walls thick enough to withstand a pressure of such magnitude that it could cause elongation of said bolts and a slight separation of said parts, the combination with said parts of a tubular sleeve slidably fitted in said bore and spanning the joint between said parts, annular grooves formed in the outer peripheral surface of said sleeve at opposite sides of said joint, and an O-ring packing of yieldable material arranged in each of said grooves and having a thickness greater than the depth of said grooves, said sleeve being of such a thickness that a predetermined high pressure therein will expand said sleeve and force its outer periphery against the wall of said bore.

3. In a fluid pressure device, the combination of two parts fastened to each other, a cylindrical bore of substantial diameter formed in one of said parts and adapted to contain liquid at a very high pressure, a tubular sleeve carried by the other of said parts and slidably fitted in said bore and spanning the joint between said parts, an annular groove formed in the outer peripheral surface of said sleeve, and an O-ring packing having a thickness greater than the depth of said groove arranged in said groove and engaging the wall of said bore, said sleeve being of such a thickness that a predetermined high pressure therein will expand said sleeve and force its outer periphery against the wall of said bore.

4. In a machine having a body, a head engaging said body, bolts fastening said head to said body, a large diameter bore formed in said body and in said head, and means for creating an extremely high pressure in said bore, the combination with said body and said head of a tubular sleeve loosely fitted in said bore and spanning the joint between said body and said head, means in said bore to prevent inward movement of said sleeve during assembly of said head to said body, continuous grooves formed in the outer peripheral surface of said sleeve at opposite sides of said joint, and a continuous packing of yieldable material arranged in each of said grooves and having a thickness greater than the depth of said grooves, said sleeve being of such a thickness that a predetermined high pressure therein will expand said sleeve and force its outer periphery against the wall of said bore.

References Cited in the file of this patent
UNITED STATES PATENTS

| | | |
|---|---|---|
| 2,168,631 | Scott | Aug. 8, 1939 |
| 2,195,547 | Vickers et al. | Apr. 2, 1940 |
| 2,436,407 | Stephens | Feb. 24, 1948 |
| 2,472,620 | Rhodes et al. | June 7, 1949 |
| 2,516,743 | Allin | July 25, 1950 |
| 2,517,290 | De Moude et al. | Aug. 1, 1950 |
| 2,595,592 | Magnuson | May 6, 1952 |